US007930194B2

(12) United States Patent
Segal

(10) Patent No.: US 7,930,194 B2
(45) Date of Patent: Apr. 19, 2011

(54) METHOD AND APPARATUS FOR DETERRING FRIVOLOUS PROFESSIONAL LIABILITY CLAIMS

(75) Inventor: Jeffrey J. Segal, Greensboro, NC (US)

(73) Assignee: Medical Justice Corp., Greensboro, NC (US)

( * ) Notice: Subject to any disclaimer, the term of this patent is extended or adjusted under 35 U.S.C. 154(b) by 1190 days.

(21) Appl. No.: 10/309,705

(22) Filed: Dec. 3, 2002

(65) Prior Publication Data

US 2004/0107121 A1 Jun. 3, 2004

(51) Int. Cl.
*G06Q 40/00* (2006.01)
(52) U.S. Cl. .......................................................... 705/4
(58) Field of Classification Search ..................... 705/4
See application file for complete search history.

(56) References Cited

U.S. PATENT DOCUMENTS

| | | | |
|---|---|---|---|
| 4,491,725 A | 1/1985 | Pritchard | |
| 4,766,539 A | 8/1988 | Fox | 705/4 |
| 5,325,291 A | 6/1994 | Garrett et al. | 705/4 |
| 5,752,237 A | 5/1998 | Cherny | 705/4 |
| 5,839,118 A | 11/1998 | Ryan et al. | 705/36 |
| 5,852,808 A | 12/1998 | Cherny | 705/4 |
| 5,875,431 A | 2/1999 | Heckman et al. | 705/7 |
| 5,895,450 A | 4/1999 | Sloo | 705/1 |
| 5,956,687 A | 9/1999 | Wamsley et al. | |
| 6,272,471 B1 * | 8/2001 | Segal | 705/4 |
| 6,324,516 B1 | 11/2001 | Shults et al. | |
| 6,615,181 B1 | 9/2003 | Segal | |
| 7,024,369 B1 | 4/2006 | Brown et al. | |
| 2002/0065758 A1 | 5/2002 | Henley | |
| 2002/0133374 A1 * | 9/2002 | Agoni et al. | 705/2 |
| 2003/0171954 A1 | 9/2003 | Guerin et al. | |
| 2003/0208380 A1 * | 11/2003 | Honeycutt | 705/2 |
| 2005/0060193 A1 | 3/2005 | Lancaster et al. | |
| 2005/0091080 A1 | 4/2005 | Biats | |
| 2005/0228685 A1 | 10/2005 | Schuster et al. | |

(Continued)

FOREIGN PATENT DOCUMENTS

EP 0 935 208 8/1999

(Continued)

OTHER PUBLICATIONS medicaljustice.com as found within the www.archive.org database.*

(Continued)

*Primary Examiner* — Luke Gilligan
*Assistant Examiner* — Neal R Sereboff
(74) *Attorney, Agent, or Firm* — Ropes & Gray LLP; Jeffrey H. Ingerman

(57) ABSTRACT

A plan of countersuit insurance provided to professionals, possibly as part of or along with their professional liability insurance, deters frivolous professional malpractice claims. The plan of insurance pays legal costs of countersuits for improper prosecution when a frivolous claim has been made and, preferably, tried to a judgment for the accused professional, and an objective review concludes that the claim was frivolous. The objective review may include initiating a disciplinary proceeding against any expert witness before a professional society to which the witness belongs, for violation of the code of conduct imposed by the society on its members. Ordinarily, such a proceeding would not be initiated unless an initial review indicated at least a possibility of frivolousness, and therefore of success in the proceeding. The outcome of the proceeding could be treated as conclusive proof of frivolousness, or could be treated as just another factor in a frivolousness determination.

36 Claims, 7 Drawing Sheets

U.S. PATENT DOCUMENTS

2006/0106690 A1     5/2006    Williard et al.
2007/0198302 A1     8/2007    Segal

FOREIGN PATENT DOCUMENTS

WO           97/40460          10/1997

OTHER PUBLICATIONS

Margulies, Jeffrey B., "Professional Societies Can Help Rid Courts of Junk Science," Legal Backgrounder, Dec. 18, 1998.*

South Dakota State Bar, "Inter-Professional Guildelines for Physicians and Attorneys in South Dakota" 2000.*

Shiffman, Melvin A, "Law and Medicine, Misrepresentation of Facts by the Expert Witness" International Journal of Cosmetic Surgery and Aesthetic Dermatology, vol. 3, No. 4, 2001.*

Berry, "The Physician's guide to medical malpractice." BUMC Proceedings 2001; 14:109-112.*

State of Texas "Medical Liability Insurance Improvement Act" Tex. Rev. Civ. Stat. Ann. art. 4590i.*

Anon., "A Dip in Malpractice Rates," *Business Week* (Abstract only), pp. 109-110, Oct. 3, 1977.

Lancianese, F.W., "Florida's Wage-Loss Program: Trend Setter or One of a Kind? Will Open Rating Laws Result in Lower Workers' Comp Premiums?," *Occupational Hazards* (Abstract only), vol. 44, No. 7, pp. 65-68, Jul. 1982.

Anon., "Novametrix Medical: Announces OEM License Agreement with Squibb Corp.'s SpaceLabs Subsidiary," *Business Wire*, Jul. 22, 1986.

Coglianese, C., "Insuring Rule 11 Sanctions," *Michigan Law Review* (Abstract only), vol. 88, No. 2, pp. 344-385, Nov. 1989.

Gross, C.E., "Fee Disputes—What This MAP Subcommittee Can Do for You," *Michigan CPA*, col. 42, No. 2, p. 23, 1990.

Robinson, W.J., "Insurance Coverage of Intellectual Property Lawsuits in the Computer Industry," *International Computer Law Adviser* (Abstract only), vol. 6, Nos. 3-4, pp. 21-42, Dec. 1991-Jan. 1992.

Math, S.E. et al., "A Look Inside the Actuarial Black Box," *Healthcare Financial Management*, vol. 46, No. 12, pp. 36-39, Dec. 1992.

Anon., "Louisiana Panel Urges No-Fault Consideration," *Journal of Commerce*, Five Star Edition, Section INS, p. 8A, Jan. 16, 1997.

Anon., "Cal. Insurers to Fight New Low-Cost Proposal," *Insurance Regulator*, vol. 10, No. 3, p. 1, Jan. 18, 1999.

Friedman, D.D., "My Academic Page," www.best.com/~ddfr/Academic/Academic.html, Sep. 2000.

Friedman, D.D., "Making Sense of English Law Enforcement in the 18th Century," www.best.com/~ddfr/Academic/England_18thc/England_18thc.html, Sep. 2000.

Segal, J., "A Solution to Frivolous Medical Malpractice Suits," *Quarterly Journal*, pp. 26-27, Jul. 2002.

Anderson, R.E., "The Crisis of 2002-2003: Causes and Solutions," PLUS Medical Professional Liability Symposium, Chicago (Mar. 12, 2003).

BlueCross BlueShield Association, "Improving Health Care Value: Quality and Cost," http://www.bcbs.com/issues/transparency/background/improving-health-care-value.html?templateName=template-28847072&print=t (2000-2006; accessed on May 9, 2007).

Oginski, "What Does a 'Right of Subrogation' Mean?" http://ezinearticles.com, Oct. 2005.

Reinker, K. et al., "Improving Medical Malpractice Liability by Allowing Insurers to Take Charge," Discussion Paper No. 556, John M. Olin Discussion Paper Series, Harvard Law School, http://law.harvard.edu/programs/olin_center/, Aug. 2006.

Rosenberg, D., "Deregulating Insurance Subrogation: Towards an Ex Ante Market in Tort Claims," Harvard Law School Public Law Research Paper No. 043 (2002).

Rosoff, A.J., "Evidence-Based Medicine and The Law: The Courts Confront Clinical Practive Guidelines," *Journal of Health Politics, Policy and Law*, vol. 26, No. 2, pp. 327-368 (2001).

Stiell, I.G., et al., "The Canadian CT Head Rule for patients with minor head injury," *The Lancet*, vol. 357, pp. 1391-1396 (May 5, 2001).

* cited by examiner

METHOD AND APPARATUS FOR DETERRING FRIVOLOUS PROFESSIONAL LIABILITY CLAIMS

BACKGROUND OF THE INVENTION

This invention relates to the reduction of frivolous professional liability claims. More particularly, this invention relates to the provision of insurance to pay the legal costs of countersuits for improper prosecution of frivolous professional liability claims, including publicizing the identities of holders of such insurance as a deterrent.

As society has become more litigious, professionals (including physicians, attorneys, architects and others) have found themselves defending an increasing number of professional liability claims brought by patients or clients unhappy with the quality of the professional services rendered, or with the results of those services. In some cases, charges of professional misconduct are warranted. However, in many more cases, the charges are unwarranted; despite competent services rendered at or above the appropriate level of care, concern and attention, and without fault on the part of the professional, the desired result may not be achieved in all cases. Nevertheless, to avoid the disruption of a protracted legal action, and to control the risk of uncertain legal costs and expenses associated with unpredictable jury outcomes, such frivolous cases are frequently settled by the accused professionals (or their professional liability carriers) for their nuisance value.

A frivolous charge of professional misconduct may be brought on behalf of an unhappy patient or client simply because there is no adequate disincentive not to do so. Although it may be possible, if the frivolous nature of the complaint can be proven, to pursue a "countersuit" for improper prosecution against the proponents of frivolous claims—e.g., against the patient/client, his or her attorney, or any expert witness on behalf of the patient/client—such countersuits frequently are not instituted or pursued because of the commitment in time, and particularly in legal fees, that is involved. By "countersuit" is meant a separate legal action brought, as countersuit plaintiff, by the accused professional who was defendant in the original lawsuit, against, as countersuit defendant, the plaintiff in the original lawsuit or another proponent of the original lawsuit, including the original plaintiff's attorney or expert witness; "countersuit" could also include a counterclaim in the original lawsuit. "Improper prosecution" is meant to include any cause of action under one or more of the following legal theories: malicious prosecution, abuse of process, intentional infliction of emotional distress, defamation, prima facie tort, barratry, breach of contract, or any other legal theory that may be appropriate.

Although these problems affect many different professional fields as discussed above, the problem is particularly acute in the case of physicians. Therefore, unless otherwise noted, the remainder of this specification will be addressed to medical malpractice claims and medical malpractice insurance. It should be understood, however, that the discussion applies equally well to other types of professional liability claims and insurance.

Even though medical malpractice claims usually are covered by insurance, they have many negative implications. First, one's competence is challenged and one's reputation is damaged, threatening one's future livelihood. Second, the stress of practicing medicine is increased. Third, the physician-patient relationship is damaged. Fourth, physicians are encouraged to practice cost-inefficient defensive medicine. Fifth, the physician is required to prepare for the lawsuit, spending time away from the office that does not generate income. Sixth, the premiums for malpractice liability insurance may increase, possibly even after a successful defense. Seventh, the physician is placed in a vulnerable and uncomfortable position as a witness. Eighth, the physician may be pitted against another physician (a) in trying to allocate blame if more than one physician was involved, or (b) where another physician appears as an expert witness on behalf of the plaintiff. Ninth, stress develops at home between the physician and his or her spouse and family. Tenth, the joy is taken out of practicing medicine. Eleventh, a judgment over the maximum coverage limits of a physician's malpractice insurance policy can bankrupt the physician.

Commonly-assigned U.S. Pat. No. 6,272,471, and commonly-assigned, U.S. patent application Ser. No. 09/420,768, filed Oct. 18, 1999, now U.S. Pat. No. 6,615,181, which are hereby incorporated by reference in their entireties, describe a deterrent to frivolous professional liability claims in the form of insurance, purchased by a professional, that pays the cost of a countersuit against a proponent (e.g., plaintiff, plaintiff's attorney, or plaintiff's expert witness) of a frivolous professional liability claim. As described in the aforementioned patent and patent application, a policy of such insurance may be issued to any physician who is deemed an acceptable risk for this type of coverage. The fact that that physician is covered by the insurance may be publicized as a deterrent to potential plaintiffs or their proponents, who may be deterred if they know that they may become countersuit defendants if their frivolous claims are unsuccessful. If the covered physician is sued for medical malpractice, and prevails, a determination is then made as to whether or not the plaintiff's claim was frivolous. If the claim is deemed to have been frivolous, a countersuit is authorized and paid for by the insurer.

Under a plan of insurance as just described, the determination of whether or not the original malpractice claim was frivolous was made by an attorney engaged by the insurer for that purpose. An initial determination might have been made by an automated system, evaluating certain objective criteria, but even then an attorney normally was engaged to make a final determination. Such a process is inherently subjective. As a result, not all countersuits authorized and funded under such a plan of insurance would necessarily be successful—i.e., not all such countersuits would necessarily result in a judgment for the countersuit plaintiff (i.e., the physician) against the countersuit defendant (i.e., a proponent of the plaintiff's position in the original medical malpractice action). Similarly, not all victims of frivolous malpractice claims would receive authorization to pursue a countersuit.

For these reasons it would be desirable to be able to provide an improved plan of professional liability countersuit insurance according to which the determination of frivolousness could be made with greater certainty.

SUMMARY OF THE INVENTION

It is an object of this invention to provide an improved plan of professional liability countersuit insurance according to which the determination of frivolousness may be made with greater certainty.

In accordance with the invention, there is provided a method of deterring prosecution of frivolous professional liability claims against professionals by recipients of professional services. According to the method, a plan of insurance is issued to a professional for paying legal costs of prosecuting an improper prosecution claim against a proponent of a frivolous professional liability claim. When the covered professional reports a professional liability claim, including data regarding the professional liability claim and disposition thereof, the report is reviewed for making a determination of whether the reported professional liability claim is frivolous. When prosecution of the original professional liability claim included testimony by an expert witness belonging to a professional society having a code of conduct for expert testimony, the review may include initiating a disciplinary proceeding before that professional society against the expert witness for violation of the code of conduct. Imposition of discipline against the expert witness by the professional society as a result of that proceeding is considered a further indication of frivolousness of the original professional liability claim.

Apparatus and a system for performing the method are also provided.

"Legal costs" means attorney's fees, as well as other expenses or disbursements (including, but not limited to, court costs, photocopy expenses, expert witness fees, etc.) that may or may not be billed through the attorney. In the preferred embodiment, "legal costs" excludes any fines, penalties or judgments that may arise from a counter-countersuit.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
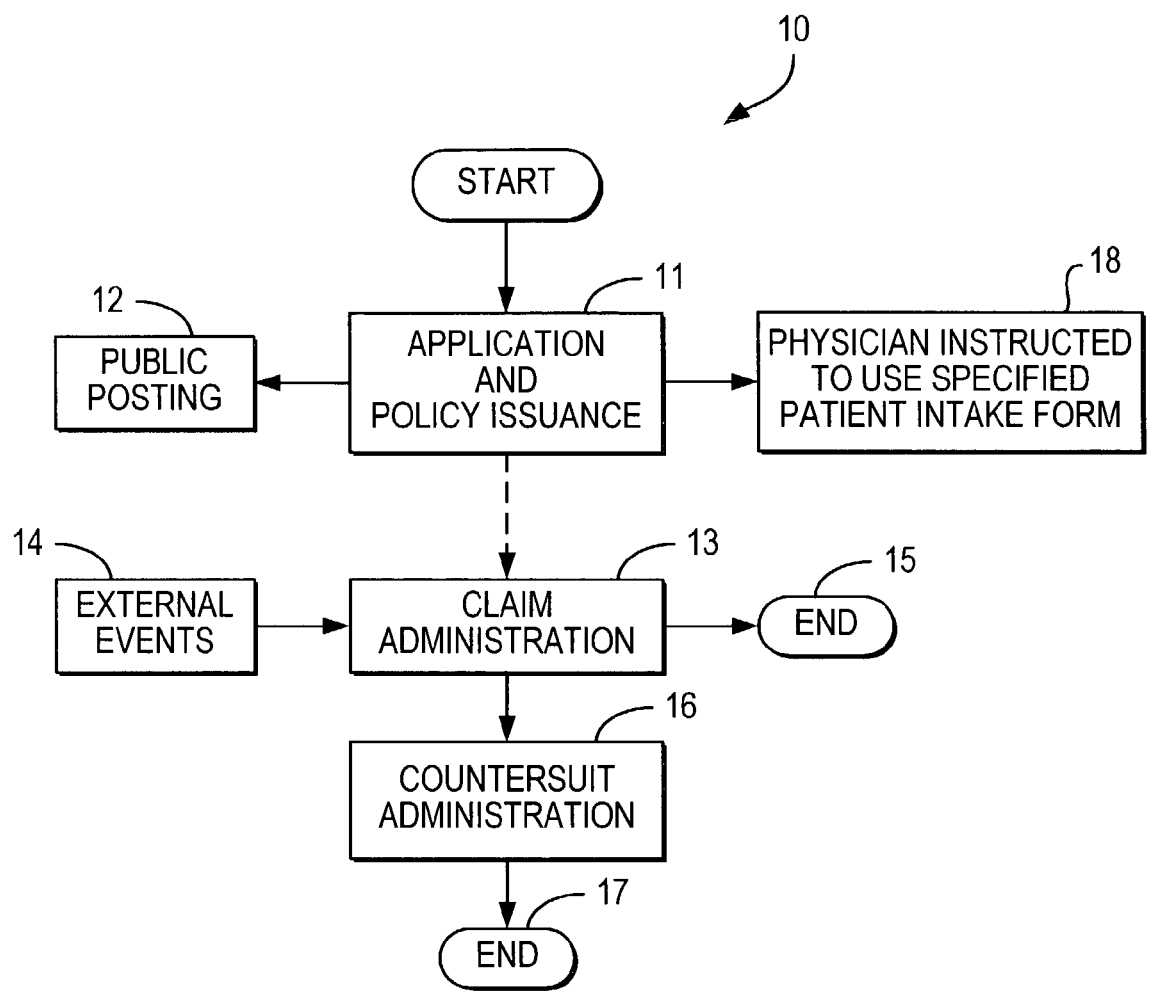
FIG. 1 is a flow diagram representing a preferred embodiment of a process according to the present invention from the initial application by a physician for coverage through the completion of a countersuit brought on behalf of that physician.

According to the present invention, the incidence of medical malpractice claims is reduced because a credible threat of a countersuit for prosecution of a frivolous claim exists. That threat is created and backed up by the availability of "countersuit insurance" which, under appropriate conditions as discussed below, will pay the legal costs of a countersuit against any proponent of a frivolous claim. Potential defendants in such a countersuit could include the original plaintiff (i.e., in a medical malpractice context, the patient who had claimed injury), the original plaintiff's attorney and any expert witness who testified on behalf of the original plaintiff. The countersuit insurance of the invention could be offered as a separate insurance policy, or as a rider to a standard medical malpractice insurance policy.

Once a physician applicant has been accepted for coverage under a policy or rider of countersuit insurance according to the present invention, the physician's name and other data would be entered into the insurance carrier's computer system. In addition to all the standard processing that would normally be carried out in connection with the issuance and support of a policy of insurance, the system preferably would copy the insured physician's name to a database of covered physicians to be publicized. Although not essential to the present invention, it is believed that the publicizing of names of physicians covered by countersuit insurance will deter the filing of frivolous medical malpractice claims because those who might bring such claims would have to consider the possibility that the physician might prevail in defending against the claim and would then institute a countersuit for improper prosecution.

The database of names of covered physicians preferably will be available to the public via a public data network such as the Internet, including, but not limited to, the World Wide Web. However, the database could also be available on a private network, or on a dial-up "BBS" ("bulletin board system"). Preferably, all providers of countersuit insurance would make their databases of covered physicians available at a common site, but individual providers or groups of providers may maintain separate sites. As explained below, the site or sites could include the actual database, or could be a search engine linked to the database of each provider participating in the particular site.

It is preferred that public access to the database be without cost to the querying member of the public, so as not to discourage potential plaintiffs or their attorneys from querying the database. In the case of a dial-up or BBS embodiment, a toll-free telephone number can be provided.

In one preferred embodiment of the invention, each insurance carrier or broker would maintain its own database of covered physicians linked to, and accessible by, a common search engine on a single World Wide Web site on the Internet. Alternatively, each insurance carrier or broker would upload the names from its proprietary database to a single database accessible from a single World Wide Web site. According to any of these alternatives, those who query the database would be advised to do so again after a suitable interval—e.g., a few days later—in case a covered physician's name is in the process of being added to the database or, particularly in the case where the public site is a common search engine that searches the databases of several insurance carriers or brokers to which it is linked, because the connection to one or more of the linked databases may be temporarily inoperative.

Whatever public access vehicle is chosen, its existence preferably would be publicized by advertisements, e.g., in the general press and in publications aimed at attorneys who handle plaintiff's medical malpractice litigation. The advertising would encourage potential plaintiffs or their representatives to check the database for the name of any potential defendant physician prior to initiating legal action. It then would be foolish for anyone to initiate a frivolous medical malpractice action without checking the database.

In addition, or as an alternative, to publicizing the fact that a physician is covered by countersuit insurance, a proponent (e.g., an attorney or expert witness) could be contacted directly (e.g., by letter, electronic mail, etc.) after initiation of a malpractice action, to advise that proponent of the countersuit insurance. Upon receipt of the letter, the proponent might then re-evaluate his or her position if the action is frivolous.

Countersuit insurance according to the invention can be offered either as a separate policy or as a rider to a medical malpractice liability insurance policy. Either way, in a preferred embodiment, if a countersuit is brought under the policy, and damages are awarded against the proponent of a frivolous malpractice claim, then the countersuit insurance carrier preferably will collect a portion—e.g., between 30% and 60%—of the damages as compensation for funding the suit, and to cover administrative costs of administering the program and funding countersuits for all policyholders. Therefore, in a preferred embodiment, any premium charged to policyholders will be minimal. Indeed, if countersuit insurance according to the invention is offered as a rider to a malpractice insurance policy, there may not need to be any additional charge beyond the premium charged for the underlying malpractice insurance policy. This is because the damages recovered in successful countersuits, plus the reduction in nuisance settlement payments on underlying malpractice claims, preferably would offset the costs of offering and administering the countersuit insurance program and the costs of prosecuting countersuits. Of course, in an alternative embodiment, the carrier may allow the physician to retain all of the countersuit recovery. Although this may necessitate the charging of a premium for countersuit coverage, it may not if the countersuit deterrent effect results in substantial savings to the carrier on malpractice claims.

In addition, in a preferred embodiment, the requirements for eligibility for countersuit insurance benefits with respect to a particular claim would be that the underlying malpractice lawsuit proceeded to a favorable judgment for the covered professional without being settled and without otherwise being terminated short of judgment, and that an objective review of the underlying malpractice claim concludes that the underlying claim was frivolous. Almost any physician who desired the countersuit coverage would likely be eligible. At one extreme is the "good" physician whose competence is beyond question and who is rarely sued. Such a physician is a good risk for countersuit insurance because the physician will rarely, if ever, make a claim for countersuit benefits. At the opposite extreme is the "bad" physician who is sued frequently and frequently settles or loses. This physician also is a good risk for countersuit insurance. Such a "bad" physician who loses on or settles the underlying claim would not be eligible for benefits under the preferred requirements set forth above. But for the cases where the "bad" physician does not settle and prevails on the underlying claim, there is no reason why that physician should not be eligible for benefits if the malpractice claim was frivolous.

The worst risk from the point of view of the insurance carrier (although likely a risk of low frequency of occurrence) could be the physician who is sued frequently but always prevails. Preferably, the insurance carrier's share of the recovery in a successful countersuit would be available to fund other countersuits on behalf of other covered physicians, spreading the cost of countersuits over all covered physicians. In the case of a physician who is sued frequently, always wins, and then always countersues, any countersuit recoveries would go toward funding subsequent countersuits on behalf of the same physician, possibly without leaving enough to fund countersuits on behalf of other covered physicians. Still, it is also possible that each countersuit recovery would have a sizable punitive component that would be well in excess of the cost of the countersuit.

As discussed above, in the preferred embodiment countersuit benefits are not available in connection with any malpractice claim that is settled, or, of course, lost by the covered physician. Moreover, even if a case is won by the physician, it is still possible that the claim was not frivolous. Therefore, as discussed above, as part of the plan of insurance, an objective review of the underlying claim, to determine whether or not it could be proved to have been frivolous, preferably is conducted when a claim for countersuit benefits is made.

In a preferred embodiment, a first stage of the objective review is conducted by an attorney retained by the countersuit insurance carrier. The attorney could be an in-house attorney, but more preferably, to maintain objectivity, is an outside attorney retained by the carrier solely for this purpose. Indeed, it may not be necessary for this review to be conducted by an attorney. A paralegal, physician or nurse, or any other individual trained to understand the relevant medical and legal issues can perform this screening function.

Alternatively, it may be possible to develop a set of criteria that could allow an objective determination of frivolousness to be made, at least in the first instance, by a computer, based, e.g., on responses by the physician to a questionnaire developed for this purpose. If a computer is used to make the initial determination of frivolousness, then preferably there is opportunity for human review of that decision. In one embodiment, human review would come only if the determination was made that there was no frivolousness, in which case the covered physician could ask for a review. In another embodiment, the computer determination would include a quantitative ranking, and whenever that ranking was not overwhelmingly toward the determination that was made—either for or against frivolousness—a review would be conducted.

In accordance with a particularly preferred embodiment of the present invention, a second stage of the objective review relies on the existence of codes of conduct in professional societies, governing their members' testimony as expert witnesses in litigation. For example, a medical society may require the following of its member physicians when they serve as expert witnesses in medical malpractice cases:

1. That the physician expert witness be impartial and not advocate a partisan position in the litigation;
2. That the physician expert witness should review any medical information in the litigation fairly, honestly and in a balanced manner;
3. That the physician expert witness be prepared to distinguish between actual negligence and an unfortunate medical outcome;
4. That the physician expert witness's testimony be based on the prevailing standards of practice at the time of the alleged malpractice;
5. That the physician expert witness be prepared to state the basis of his/her testimony and to discuss alternate views; and
6. That the physician expert witness not link compensation to the outcome of the litigation.

In order to get an independent evaluation of the frivolousness, or lack thereof, of the original malpractice claim, a disciplinary action may be brought against the malpractice plaintiff's expert witness before the relevant professional society for violation of that society's code of conduct. Such proceedings are typically less expensive than litigation. Moreover, the burden of proof is generally lower in such proceedings than in litigation. Therefore, if one cannot prevail against the expert witness in such a disciplinary proceeding, one will be unlikely to prevail in litigation. In other words, a victory by the expert witness in the disciplinary proceeding is an indication (although not necessarily a conclusive indication) of lack of frivolousness of the original claim. On the other hand, if one does prevail against the expert witness in the disciplinary proceeding, that would be an indication that the original claim was frivolous, and may even be admissible in subsequent countersuit litigation, whether against the expert witness or against another proponent of the initial claim.

The independent evaluation provided by a professional society disciplinary proceeding against the expert witness could be used in every case as an objective determination of frivolousness before authorizing a countersuit. Alternatively, it might be used instead of the attorney review. As another alternative, a disciplinary proceeding might be used only when an initial determination by an attorney is that the original claim was frivolous, as a last check before committing to full-blown litigation. As yet another alternative, the disciplinary proceeding can be used for objective determination only when the attorney's initial determination is that the original claim was not frivolous, as a last check to prevent denial of countersuit coverage in meritorious cases.

If after the initial attorney determination, or the disciplinary proceeding, or both, depending on which has been used to evaluate frivolousness, then as a failsafe, any determination of frivolousness would receive a de facto review by the attorney to whom the countersuit was assigned, as part of his or her preparations for bringing the countersuit.

As part of a plan of insurance in accordance with the invention, a covered physician may be required to enter into an agreement with each new patient (e.g., as part of a patient intake agreement) that (1) the patient will not bring a frivolous professional liability action against the physician, and (2) if the patient does bring a professional liability action, the patient will hire only expert witnesses who abide by standards of conduct of the type described above. Alternatively, the physician may be required to ask each patient to agree to only one of those conditions. If a patient brings a frivolous action after making such an agreement, an additional count of breach of contract can be added to any countersuit.

The invention will now be described with reference to the drawings.

FIG. 1 shows an overview of a preferred embodiment of the process 10 for administering the plan of countersuit insurance according to the present invention. Process 10 starts with module 11, which is explained in more detail below. Briefly, in module 11 a physician's application for coverage under a policy of countersuit insurance is made, accepted and processed and the countersuit insurance policy is issued if the application is approved. As part of issuance of the policy, the covered physician's name preferably is posted on a publicly accessible database as indicated at step 12, and the physician preferably is instructed at step 18 to use a patient intake form including an agreement such as the one discussed above.

Next, process 10 proceeds to module 13, based on the occurrence of external events at 14. Briefly, in module 13, a physician, having been sued for malpractice as part of events 14, makes a claim for countersuit benefits, and the claims administration process—possibly including a professional society disciplinary proceeding as described above—is carried out to determine whether or not the physician is entitled to benefits. If not, process 10 ends at 15.

If in claim administration module 13 it is determined that the physician is eligible for countersuit benefits, then funding for the filing of a countersuit is authorized, and process 10 proceeds to countersuit administration module 16, in which the progress of the countersuit is monitored, attorneys' bills are paid and the insurance carrier's share of any damages awarded is collected. Process 10 then ends at 17.

Figure 2:
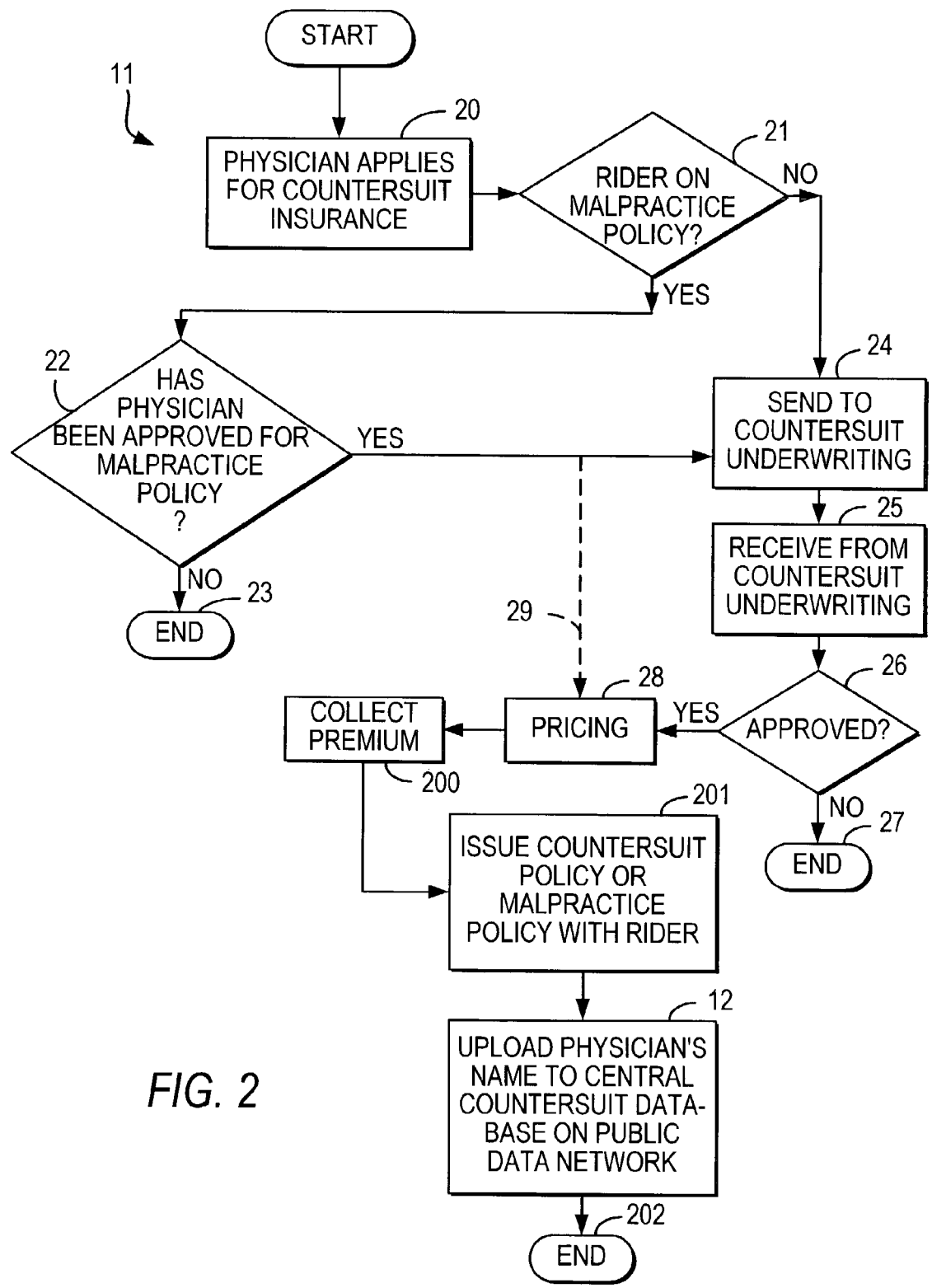
FIG. 2 is a flow diagram of the application/issuance module of the process of FIG. 1, including database posting according to the invention.

Application and issuance module 11 is shown in more detail in FIG. 2. Module 11 begins at step 20 where the physician submits an application for countersuit insurance. The application data preferably are filled in by the physician on a paper form (not shown) and then preferably entered into the insurance carrier's data processing system 510 as at keyboard 528 (see FIG. 5). Alternatively, subject to relevant government-imposed insurance regulations, an electronic application can be made available on a publicly accessible data network such as the Internet, and the application data entered by the physician can be entered into system 510 directly at 534 via modem or router 532.

As mentioned above, countersuit insurance according to the invention can be offered as a stand-alone policy of insurance or as a rider to a malpractice insurance policy. At test 21, it is determined (by reference to the application data) whether the applicant physician is applying for a stand-alone policy or a rider. (The application for a rider could be for a rider on a new malpractice insurance policy, or could be for a new rider to be added on renewal of an existing malpractice insurance policy.) If the physician has applied for a rider, then at test 22 it is determined whether or not the physician has been approved for the underlying malpractice coverage. If at test 22 the physician has not been approved for malpractice coverage (either because of the physician's risk rating or other factors, or because no application was made for an underlying malpractice insurance policy, meaning that the request for a rider was an error), then the process ends at 23 and no coverage is provided.

If at test 22 the physician has been approved for the underlying medical malpractice insurance policy, or if at test 21 the physician is not applying for a rider but for a stand-alone policy, the process proceeds to step 24 for underwriting, where it is determined whether or not the physician qualifies, from a risk management perspective, for the countersuit insurance. Although it may be possible to provide a sufficiently complex expert system, and to gather sufficient information on the application, for the underwriting to be performed automatically (e.g., by a computer), traditionally underwriting has been done manually (e.g., by actuaries). Thus at step 24 the application data would be sent to an underwriter and the process would wait for completion of the underwriting. At step 25, on completion of the underwriting, the application would be returned and the underwriter's comments and conclusions would be entered into the system (or, in the case of automated underwriting, the underwriting conclusions would be generated and stored). Note that automated underwriting, if used, can be carried out by the carrier's computer system or by a remote underwriting operation. Next, at test 26, the process would determine, based on the underwriter's entries (or the automated underwriting), whether or not to approve the application. If not, the process ends at 27. If at test 26 the application is approved, then the process proceeds to step 28 for pricing of the countersuit insurance.

The underwriting step could be unnecessary, particularly where the countersuit coverage is being purchased as a rider to a malpractice policy, for reasons set forth above. Specifically, it may be that every applicant is a good risk for this type of insurance, as discussed. When the coverage is being purchased as a stand-alone policy, some underwriting may be required. However, when the coverage is being purchased as a rider, it may be possible to avoid underwriting and skip directly to pricing step 28, as indicated by dashed alternate path 29.

As discussed above, countersuit insurance according to the invention could pay for itself, especially when offered as a rider to a malpractice insurance policy. Therefore, pricing step 28 may be unnecessary (i.e., apart from the pricing of the coverage as a whole) and may constitute the imposition of a "zero" premium. However, it may be that insurance carriers will charge at least a nominal administrative charge for countersuit coverage, and moreover it may be found that the coverage does not pay for itself, depending on how the invention is implemented, so that pricing step 28 would be required.

Following pricing step 28, process 10 continues with step 200 in which the premium set in step 28 is collected, and in step 201 a countersuit insurance policy, or a malpractice insurance policy with a countersuit insurance rider, is issued, or an existing malpractice insurance policy is renewed with a countersuit rider (whether or not the physician has purchased the rider before). At the time that the policy is issued or, as a practical matter, shortly thereafter (perhaps on a regular basis such as daily), the name of the covered physician preferably is uploaded to a publicly available database.

Figure 2A:
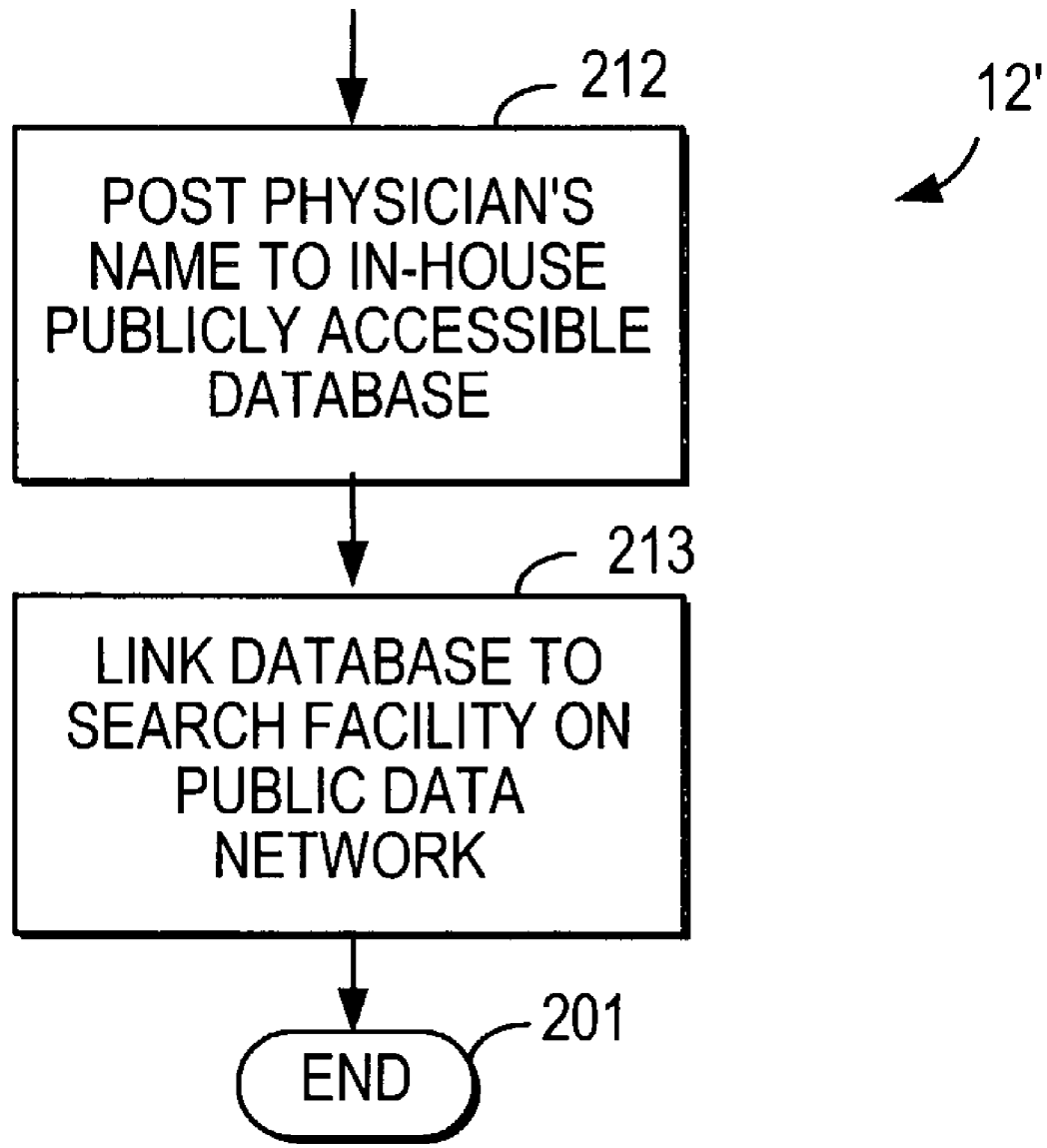
FIG. 2A is flow diagram of an alternative embodiment of the database posting shown in FIG. 2.

As shown in FIG. 2, this posting step 12 preferably involves posting the physician's name to a central database of all physicians covered by countersuit insurance issued by any insurance carrier or broker, which is available on a public data network such as the World Wide Web portion of the Internet. In an alternative shown in FIG. 2A, the posting step 12' involves the posting at step 212 of the physician's name to a publicly accessible database on an in-house computer system at the insurance carrier or broker, which is then linked at step 213 to a search facility that is available on a public data network. Again, this could be a search engine available on a World Wide Web site, such as those using the Common Gateway Interface search protocol. Preferably, if the latter embodiment is used, all insurance carriers and brokers link their databases to the same search engine.

Whatever searching mechanism is provided, preferably if a person querying any database according to the invention (whether it is one central database, one central searching site, or one of several sites to be searched), then if a particular physician's name is entered as the search criterion, the system will return not only the name entered, but also similar names. Preferably, the list of names returned will be alphabetical centered on the name entered by the searcher, with names listed before and after. If the name entered by the searcher is not found in the search, then preferably the results are centered on the closest match. This would allow the searcher to check for alternate spellings, etc., and would account for a search based on a diminutive of the physician's given name (e.g., "Bob" instead of "Robert"). Although in the most particularly preferred embodiment only alphabetically similar names would be returned, in alternative embodiments it is possible to provide more sophisticated searching that would check alternate spellings and similar-sounding names that are spelled differently. In any event, the searcher preferably would be advised to check other spellings, etc., when the results are returned.

Module 11 ends at 202 following posting step 12 or 12', if used, and otherwise preferably ends at step 201.

Figure 3:
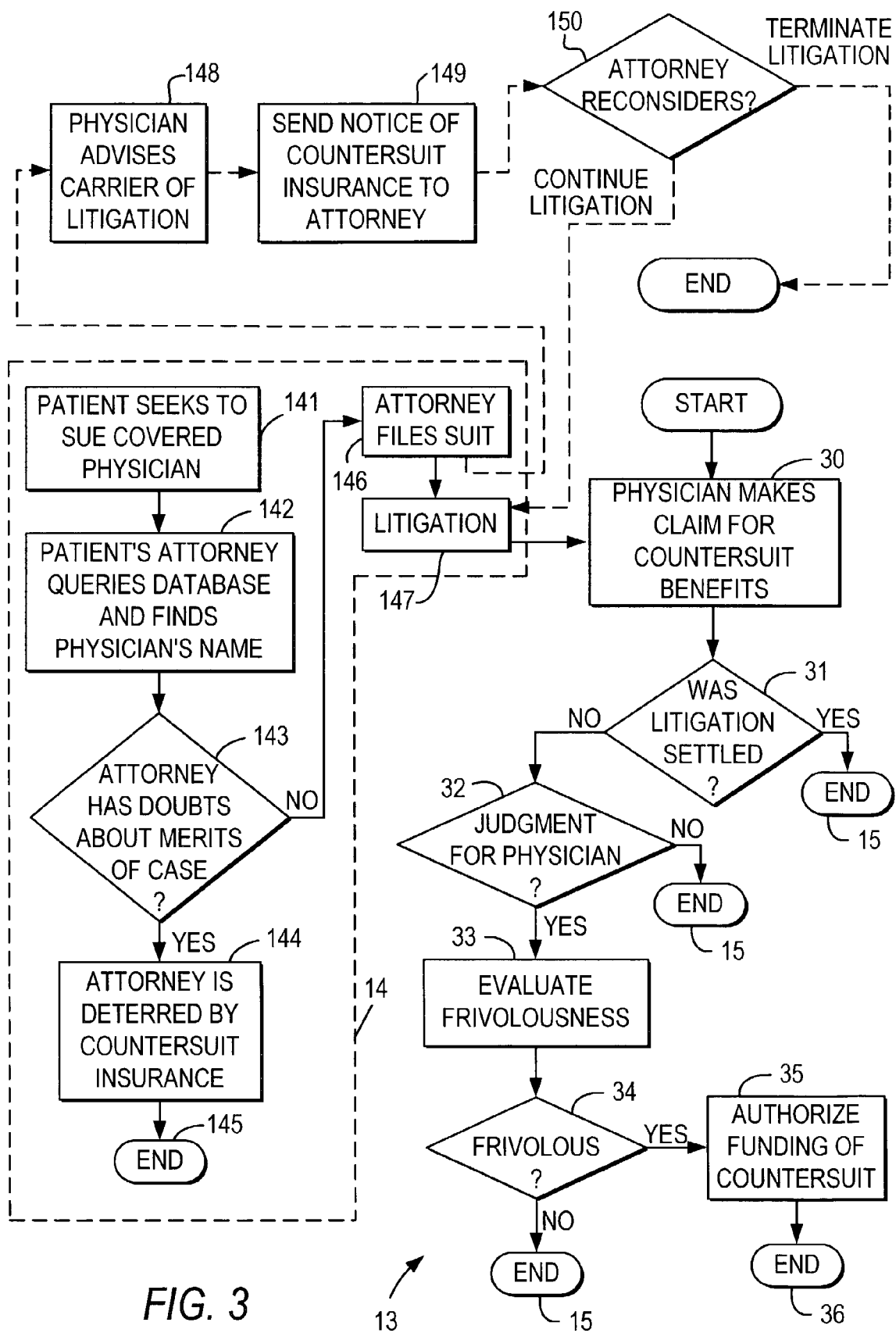
FIG. 3 is a flow diagram of the claims processing/countersuit qualification module of the process of FIG. 1.

FIG. 3 shows claim administration module 13, as influenced in an illustrative example by external events 14. At event 141, a patient seeks to sue a physician covered by countersuit insurance according to the present invention. At event 142, the patient has contacted his or her attorney, who queries the publicly accessible countersuit database or search facility (or databases or search facilities if each carrier maintains a separate database, or if different groups of carriers maintain different group databases) and finds that the physician is listed. The attorney then considers at event 143 any doubts regarding the merits of the plaintiff's case. If the attorney has sufficient doubts, he or she will be deterred at event 144 from filing suit against the covered physician, and the patient's attempt to sue the physician ends at 145. If at event 143 the attorney is not deterred, then at event 146 the attorney files suit on behalf of the patient, and at event 147, the litigation proceeds to a conclusion. It should be noted that the posting of a covered physician's name in a publicly accessible database is not a necessary component of this invention, and countersuit benefits could be available even if events 142 and 143 do not occur.

Optionally, whether or not the covered physician makes a formal claim for countersuit benefits upon commencement of litigation 147, preferably the covered physician is required to inform the countersuit carrier at step 148 that litigation 147 has been commenced. This gives the carrier the opportunity to send communication 149 (e.g., letter or electronic mail) to the patient's attorney advising the attorney of the physician's countersuit coverage. This is particularly desirable where coverage is not publicized via a publicly accessible database. Upon receipt of communication 149, the attorney may at step 150 reconsider the merits of, and terminate, litigation 147. In that event, nothing further occurs.

However, if litigation 147 continues, then after litigation 147, claims administration module 13 begins at step 30, as the physician, on conclusion of litigation 147, makes a claim for benefits (or confirms a claim if made previously as part of step 148) under the countersuit policy or rider. At test 31, it is determined whether or not litigation 147 was settled or otherwise terminated short of final judgment. If it was, then in the preferred embodiment the physician is not eligible for benefits and claim administration module 13 ends at 15. If at test 31 it is determined that litigation 147 was not settled or otherwise terminated short of final judgment, then at test 32, it is determined whether or not judgment in litigation 147 was rendered for the physician. If at test 32 it is determined that judgment has been entered against the physician, then in the preferred embodiment claim administration module 13 ends at 15. If at test 32 it is determined that judgment has been entered for the physician and has been sustained on appeal or no appeal was taken within the time for doing so, then in the preferred embodiment at step 33 (shown in more detail in FIG. 3A) the frivolousness of the underlying malpractice claim is analyzed.

Figure 3A:
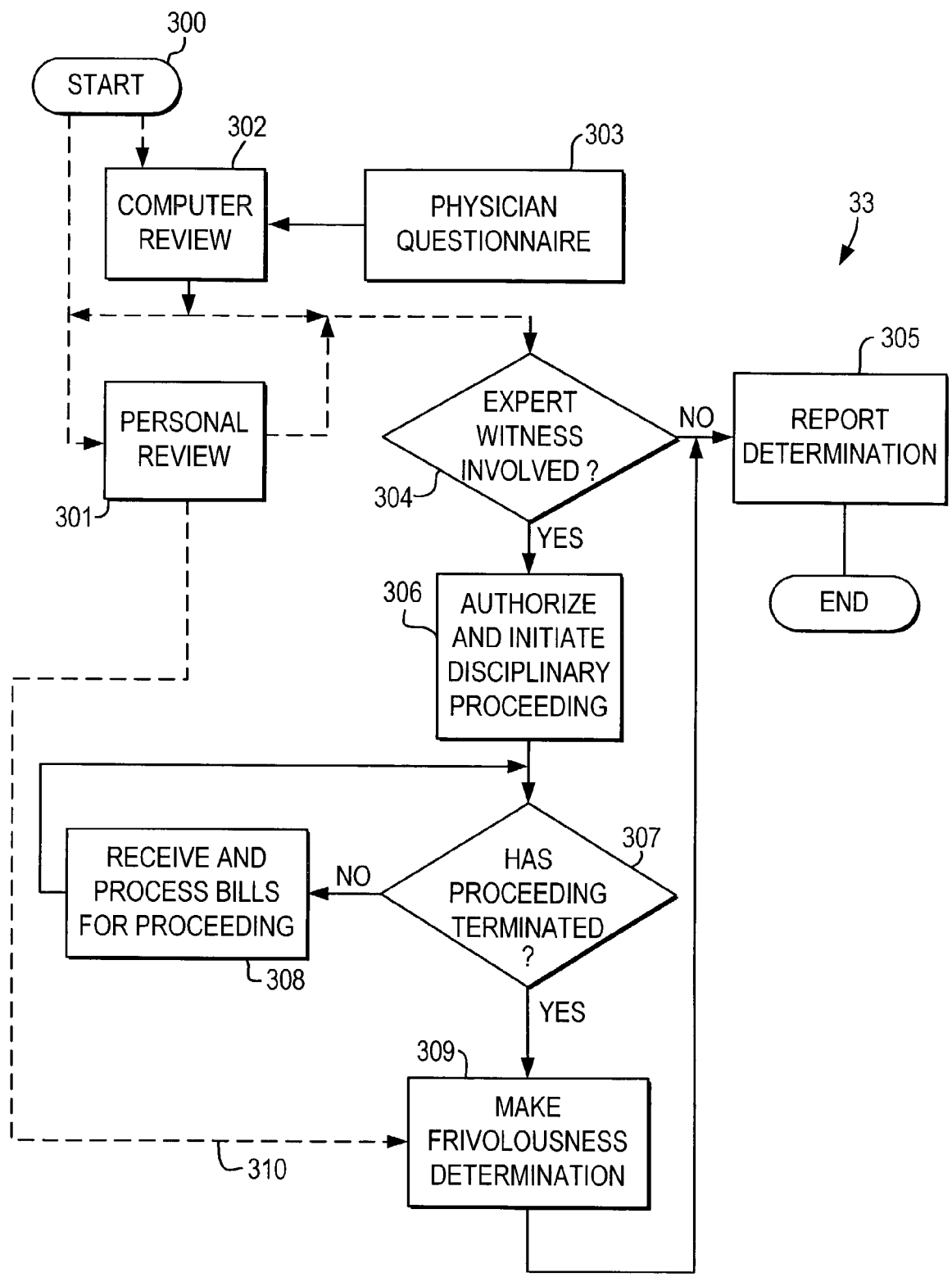
FIG. 3A is a flow diagram of a frivolousness determination within the module of FIG. 3.

FIG. 3A shows frivolousness determination step 33 in more detail. The process starts at 300 and proceeds either to a personal review 301 by appropriate personnel (as described above) of the original underlying malpractice action, or computer review 302 of that underlying action. If computer review 302 is used, it preferably is based at least in part on the physician's answers to a questionnaire 303 regarding the underlying action. As indicated by dashed paths, whether personal review 301 alone, computer review 302 alone, or a combination of both (in this last case the personal review 301 ordinarily would follow computer review 302), is used is a matter of the design of the particular plan of countersuit insurance and its underlying actuarial assumptions. In any event, after either or both of personal review 301 and computer review 302, according to a plan of countersuit insurance in accordance with the present invention, a determination is made at test 304 as to whether or not an expert witness was involved in the underlying malpractice litigation. If not, a determination of frivolousness is made at step 305 based on the results of personal review 301 and/or computer review 302 (the weight given to personal review 301 or computer review 302 will depend on the particular plan) and the process ends.

However, if at test 304 it is determined that an expert witness was involved, then at step 306 a disciplinary proceeding against the expert witness before the relevant professional society may be authorized and initiated. It should be noted that most malpractice cases ordinarily involve at least one expert witness, and therefore the result of test 304 normally would be to authorize a disciplinary proceeding at test 306. However, plan designs may differ. As discussed in part above, the disciplinary proceeding route may be used only where the personal and/or computer reviews are inconclusive or reach contradictory results, or only as a failsafe if those reviews reach predetermined results (depending on the plan design, the failsafe review could occur to prevent unjust denial of countersuit coverage or to prevent an inappropriate award of countersuit coverage). In some plans, for coverage for a type of profession where there is almost always an expert witness (as in medical malpractice), it also is possible to use the disciplinary proceeding route as the only test of frivolousness, although this might not be possible in the case of professional liability actions in some professions if it is not routine to rely on expert witnesses in such actions. And as noted by dashed line 310, the person conducting personal review 301 may have discretion in some cases, even where an expert witness is involved, to make a frivolousness determination 309 without resorting to a disciplinary proceeding.

At test 307, it is determined whether or not the disciplinary proceeding has concluded. If not, then at step 308 the system receives, and processes for payment, bills for conducting the proceeding (e.g., attorney's bills), and returns to test 307. When at test 307 it is determined that the disciplinary proceeding has terminated, then at step 309 a frivolousness determination is made. How the determination at step 309 is made is a function of plan design. In one embodiment, the determination of the disciplinary proceeding may be used as a conclusive objective determination of the frivolousness or lack of frivolousness of the underlying claim. In another embodiment, the determination of the disciplinary proceeding may be used as only one of several factors in an analysis conducted by a human reviewer, or by a computer. In any event, the determination at step 309 is reported at step 305 and process 33 ends.

When the frivolousness of the claim has been analyzed and the conclusion entered into the system, then at test 34 it is determined whether or not the claim was frivolous. If at test 34 it is determined that the claim was not frivolous, then claim administration module 13 ends at 15. If at test 34 it is determined that the claim was frivolous, then at step 35 a countersuit and funding therefor are authorized and claim administration module 13 ends at 36.

Figure 4:
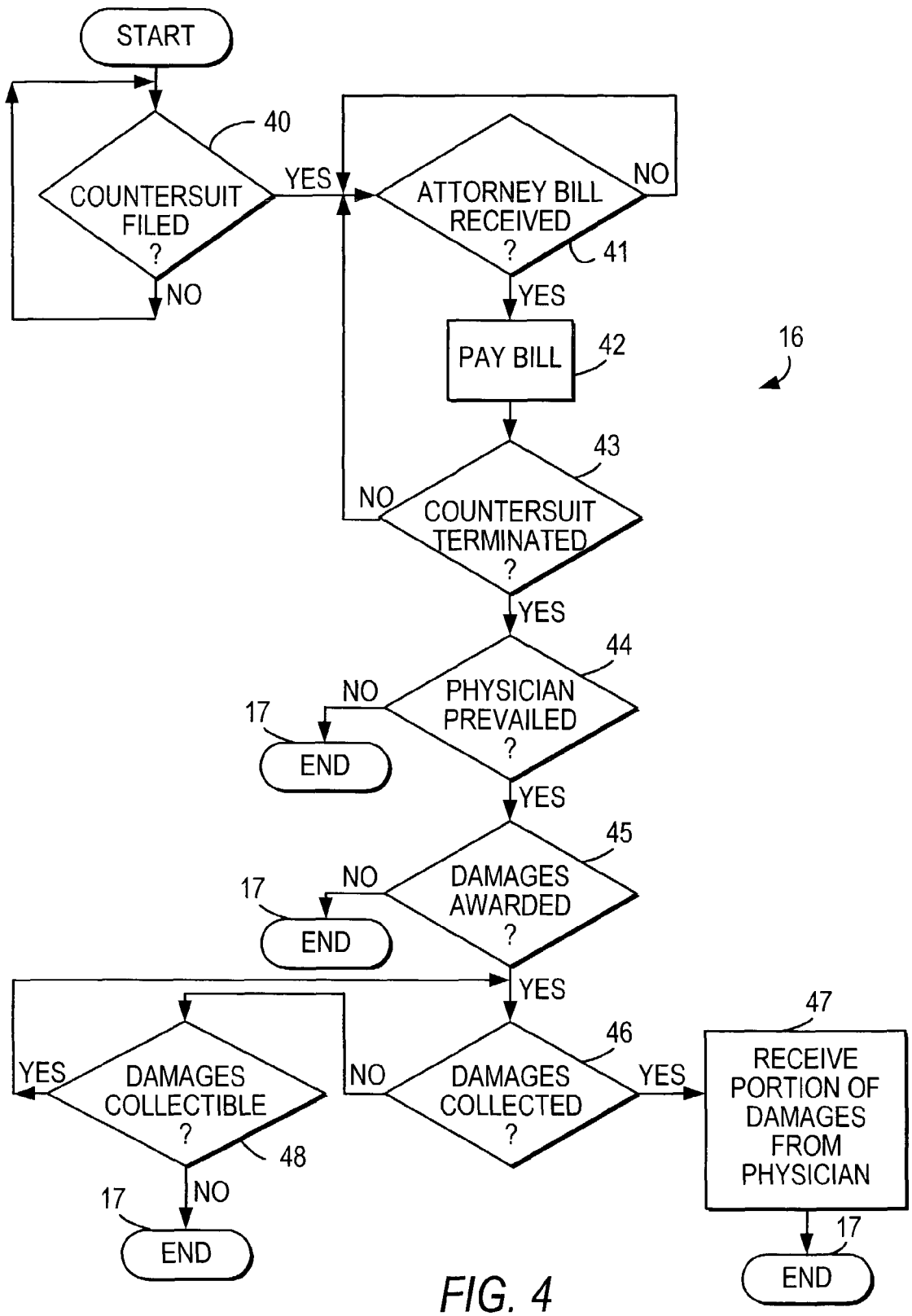
FIG. 4 is a flow diagram of the countersuit administration module of the process of FIG. 1.

FIG. 4 shows countersuit administration module 16, which starts at test 40 awaiting the filing of the countersuit authorized in step 35 of module 13. Once the countersuit has been filed, the module 16 awaits at test 41 the receipt of a bill (preferably by computer) from the attorney handling the countersuit on behalf of the physician. The bill would typically include the attorney's fees, as well as other disbursements or expenses incurred by the attorney on behalf of the countersuit plaintiff physician. Bills for such disbursements or expenses could also come directly to the insurance carrier from the provider of the product or service to the attorney, and for purposes of FIG. 4 should be treated as attorney bills. Once a bill is received, then at step 42 funds are disbursed (preferably by computer) to pay the bill, the expenditure having been authorized by the authorization 35 to file the countersuit. Step 42 preferably includes a review of the bill to determine that it is correct and reasonable, and may involve returning the bill to the attorney or provider, and receipt of a corrected bill. As soon as the bill has been paid, then at test 43 it is determined whether or not the countersuit has terminated, including termination of all appeals or the expiration of the time for filing an appeal. If it has not, then module 16 loops back to test 41 to await further bills.

Once the countersuit has terminated, then it is determined at test 44 whether or not the physician prevailed in the countersuit. If not, process 10 ends at 17. If at test 44 it is determined that the physician did prevail, then at test 45 it is determined whether or not damages were awarded. If not, process 10 ends at 17. If at test 45 it is determined that damages were awarded, then at test 46 it is determined whether or not damages were collected. If so, then at step 47, a predetermined share of the damages (e.g., 30%, 40% or 50% according to the policy terms, which could specify any percentage, including 0%) is collected from the physician. If at test 46 it is determined that damages that were awarded have not been collected, then at test 48 it is determined whether or not the damages are collectible (e.g., the defendant might be judgment-proof). If not, process 10 ends at 17. Otherwise, process 10 loops back to test 46 to await collection of the damages.

Figure 5:
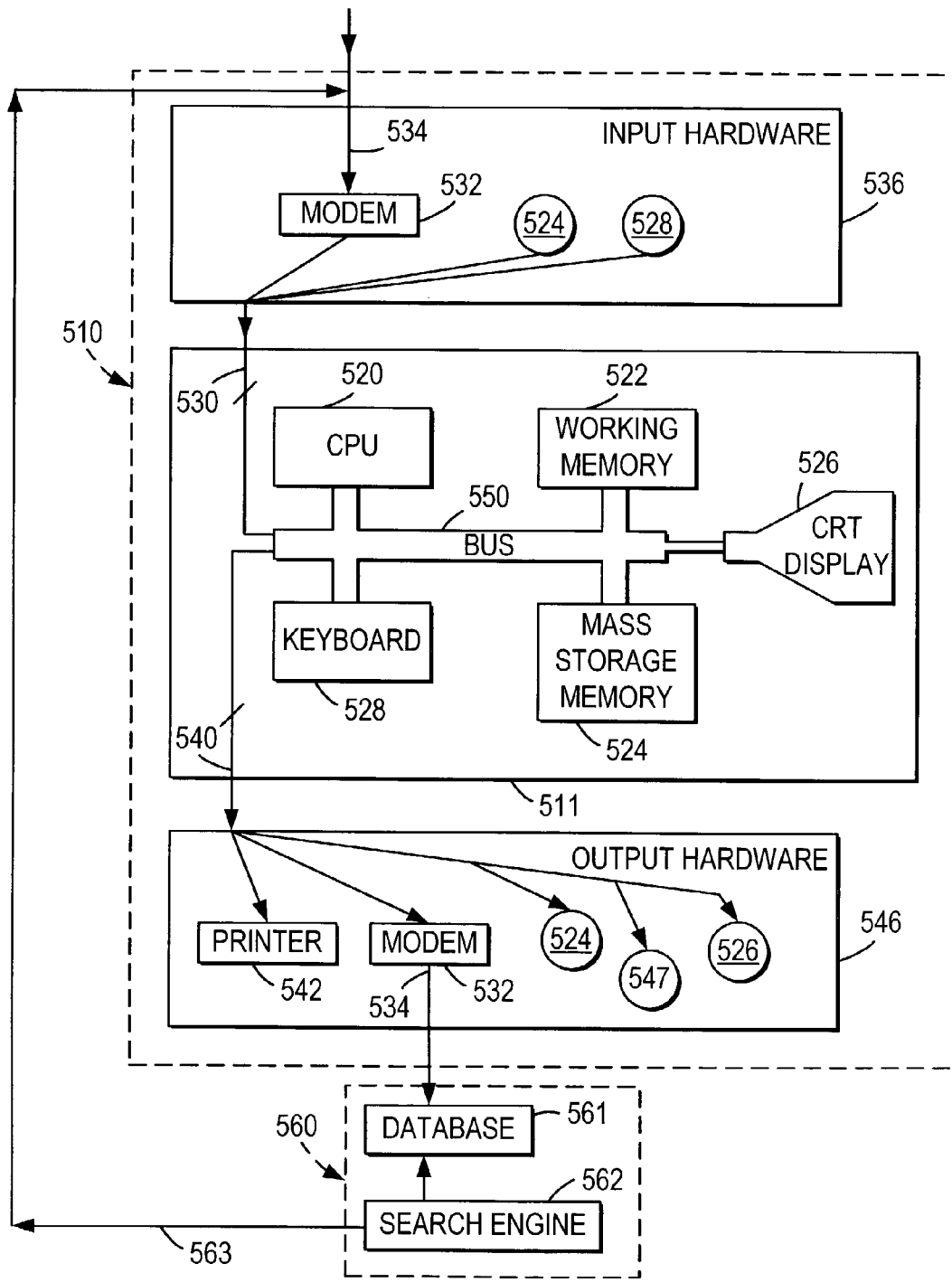
FIG. 5 is a schematic view of a preferred embodiment of a hardware system for implementing the present invention.

An exemplary computer hardware system 510 with which the present invention may be implemented is shown in FIG. 5. In FIG. 5, which shows a preferred embodiment of apparatus according to the invention, system 510 includes a computer 511 comprising a central processing unit ("CPU") 520, a working memory 522 which may be, e.g., RAM (random-access memory) or "core" memory, mass storage memory 524 (such as one or more disk drives or CD-ROM drives), one or more cathode-ray tube ("CRT") display terminals 526, one or more keyboards 528, one or more input lines 530, and one or more output lines 540, all of which are interconnected by a conventional bidirectional system bus 550.

Input hardware 536, coupled to computer 511 by input lines 530, may be implemented in a variety of ways. Modem or modems 532, which also may be routers or other computer-to-computer communications devices, connected by a telephone line or dedicated data line (such as a T1 or T3 line) 534 can be used to allow attorneys to dial up in an embodiment in which the carrier maintains its own database (on mass storage device 524) and allows direct dial-up access. Modems/routers 532 also may be used to allow access by a central Internet search engine 562 in an embodiment where each carrier maintains its own database but access is through the central search engine. Alternatively or additionally, the input hardware 530 may comprise CD-ROM drives or disk drives 524. In conjunction with display terminal 526, keyboard 528 may also be used as an input device. For example, application data, underwriting data from the underwriter (see above), or frivolousness analysis data from the reviewer (see above), may be entered through one or more keyboards 528.

Output hardware 546, coupled to computer 511 by output lines 540, may similarly be implemented by conventional devices. By way of example, output hardware 546 may include CRT display terminal 526 for displaying the premium to be charged or whether or not an application is approved or a countersuit authorized. Output hardware 546 might also include a printer or other printing device 542, so that hard copy output may be produced, or a disk drive 524, to store system output for later use. Where the names of covered physicians are to be uploaded to a central database 561 (e.g., at a site 560 on the Internet), information may be transmitted over telephone or dedicated data lines (such as T1 or T3 lines) 534, possibly with the use of modem or router 532.

Output hardware 546 preferably also includes a payment unit 547 for disbursing funds to attorneys who are prosecuting authorized countersuits, and to other providers who may bill directly as discussed above. Payment unit 547 could be a check printer if payment is made by check. Alternatively, payment unit 547 could be an electronic funds transfer unit that, using modem/router 532, communicates with the carrier's bank and the attorney's or provider's bank to transfer funds directly to the attorney's or provider's account.

Internet site 560 preferably includes a search engine 562 for querying database 561 or, where site 560 does not include database 561, search engine 562 will query the individual carrier databases via connections such as connection 563 to input data line 534. Indeed, a carrier if desired could provide access to its database both through the Internet site 560 and by a dial-up facility at input data line 534. Moreover, even if an external central database 561 is used, it need not be hosted on an Internet site, but could be accessible on a dial-up basis, or it could be accessible both through the Internet and as a dial-up facility.

In operation, CPU 520 coordinates the use of the various input and output devices 536, 546, coordinates data accesses from mass storage 524 and accesses to and from working memory 522, and determines the sequence of data processing steps.

The use of professional society disciplinary proceedings as a gauge of frivolousness provides a more objective determination than could be made in previously known plans of this type. Whether used as a conclusive determination of frivolousness or as only another factor to be considered, the result of the disciplinary process is an objective determination by a third party that presumably has no stake in the underlying malpractice claim or any subsequent countersuit.

It will be understood that although the invention has been described in connection with deterring frivolous medical malpractice claims against physicians (and other health-care professionals), countersuit insurance according to the present invention to deter frivolous professional liability claims can be provided, using the same principles, to any professional, in which case in the foregoing specification "physician" should be read as "professional" and "malpractice" or "medical malpractice" should be read as "professional liability." Moreover, the specifics of the plan of insurance described, including the qualifications for coverage and for benefits, are exemplary only, and a plan of countersuit insurance according to this invention could be implemented differently.

Thus it is seen that an effective deterrent to the filing and prosecution of frivolous professional liability claims has been provided. One skilled in the art will appreciate that the present invention can be practiced by other than the described embodiments, which are presented for purposes of illustration and not of limitation, and the present invention is limited only by the claims which follow.

What is claimed is:

1. A method of using an electronic digital computer system to deter prosecution of frivolous professional liability claims against professionals by recipients of professional services, said method comprising:

accepting entry into said computer system of application data from a professional for a plan of insurance to deter prosecution of frivolous professional liability claims against professionals by recipients of professional services by paying legal costs of prosecuting an improper prosecution claim against a proponent of a frivolous professional liability claim, said application data including acceptance by said professional of a condition of coverage under said plan of insurance requiring said professional to obtain a written agreement from each new recipient of services from said professional, said agreement specifying that in connection with any claim by said recipient against said professional, said recipient will engage only an expert witness who belongs to a professional society having a code of conduct for expert testimony and having a disciplinary procedure for violations of said code of conduct;

accepting entry of underwriting data into said computer system;

processing said application data and said underwriting data in said computer system, including computing pricing for said plan based on said application data and said underwriting data, and issuing said plan of insurance based on said application data and said underwriting data;

accepting entry into said computer system of a request, from a covered professional, for benefits under said plan of insurance, said request including a report of a professional liability claim, including data regarding said professional liability claim and disposition thereof, and data regarding imposition of discipline against said expert witness by said professional society; and processing said request for benefits in said computer system to make a determination of whether said reported professional liability claim is frivolous; wherein:

said processing said request for benefits comprises consideration by said computer system of said data regarding imposition of discipline against said expert witness by said professional society.

2. The method of claim 1 further comprising, on completion of said processing said request for benefits, when said determination is that said reported professional liability claim is frivolous, authorizing by said computer system of filing of a lawsuit by or on behalf of said covered professional for improper prosecution against a proponent of said frivolous professional liability claim.

3. The method of claim 1 wherein said processing said request for benefits further comprises an initial review by said computer system, prior to said consideration by said computer system of said data regarding imposition of discipline, based on said data regarding said professional liability claim and disposition thereof.

4. The method of claim 1 wherein said application data further includes acceptance by said professional of a condition of coverage under said plan requiring said professional to obtain a further written agreement from each new recipient of services from said professional, said further agreement specifying that said recipient will not bring any frivolous professional liability claim against said professional.

5. The method of claim 1 further comprising advising others of said issuing.

6. The method of claim 5 wherein said advising comprises, upon initiation of a professional liability claim against said professional, sending by said computer system of a communication to a proponent of said professional liability claim advising said proponent that said professional is covered by said plan of insurance.

7. The method of claim 5 wherein said advising comprises:

maintaining a database of professionals covered under said plan of insurance;

linking said database to a publicly-accessible data communications interface for viewing by any member of the public; and publicizing existence of said database.

8. The method of claim 7 wherein said linking comprises linking said database to a public data network.

9. The method of claim 1 further comprising, for each professional accepted for coverage under said plan of insurance, printing by said computer system of a certificate evidencing said coverage.

10. The method of claim 1 further comprising disbursing by said computer system of funds to pay costs of prosecuting said improper prosecution claim.

11. The method of claim 10 further comprising disbursing by said computer system of funds to pay costs of a disciplinary procedure against said expert witness before said professional society.

12. The method of claim 1 further comprising disbursing by said computer system of funds to pay costs of a disciplinary procedure against said expert witness before said professional society.

13. A method of using an electronic digital computer system to deter prosecution of frivolous professional liability claims against professionals by recipients of professional services, said method comprising:
accepting entry into said computer system of application data from a professional for a plan of insurance to deter prosecution of frivolous professional liability claims against professionals by recipients of professional services by paying legal costs of prosecuting an improper prosecution claim against a proponent of a frivolous professional liability claim, said application data including acceptance by said professional of a condition of coverage under said plan requiring said professional to obtain a written agreement from each new recipient of services from said professional, said agreement specifying that in connection with any claim by said recipient against said professional, said recipient will engage only an expert witness who belongs to a professional society having a code of conduct for expert testimony and having a disciplinary procedure for violations of said code of conduct;
accepting entry of underwriting data into said computer system;
processing said application data and said underwriting data in said computer system, including computing pricing for said plan based on said application data and said underwriting data, and issuing said plan of insurance based on said application data and said underwriting data.

14. A system of deterring prosecution of frivolous professional liability claims against professionals by customers, said system comprising:
electronic digital computer means for processing an application from a professional for, and issuing to said professional, a plan of insurance to deter prosecution of frivolous professional liability claims against professionals by recipients of professional services by paying legal costs of prosecuting an improper prosecution claim against a proponent of a frivolous professional liability claim, said means for processing and issuing including:
means for accepting entry of application data, said application data including acceptance by said professional of a condition of coverage under said plan of insurance requiring said professional to obtain a written agreement from each new recipient of services from said professional, said agreement specifying that in connection with any claim by said recipient against said professional, said recipient will engage only an expert witness who belongs to a professional society having a code of conduct for expert testimony and having a disciplinary procedure for violations of said code of conduct,
means for accepting entry of underwriting data,
means for computing pricing for said plan based on said application data and said underwriting data, and
means for issuing said plan of insurance based on said application data and said underwriting data;
means for accepting a request, from a covered professional, for benefits under said plan of insurance, said request including a report of a professional liability claim, including data regarding said professional liability claim and disposition thereof, and data regarding imposition of discipline against said expert witness by said professional society; and
means for making a determination of whether said reported professional liability claim is frivolous, including considering discipline against said expert witness by said professional society.

15. The system of claim 14 further comprising means for, when said determination is that said reported professional liability claim is frivolous, authorizing filing of a lawsuit by or on behalf of said covered professional for improper prosecution against a proponent of said frivolous professional liability claim.

16. The system of claim 14 wherein said means for making a determination further comprises means for making an initial review based on said data regarding said professional liability claim and disposition thereof, prior to considering imposition of discipline against said expert witness by said professional society.

17. The system of claim 14 wherein said means for accepting entry of application data accepts entry of further application data including acceptance by said professional of a further condition requiring said professional, as a condition of coverage under said plan, to obtain a written agreement from each new recipient of services from said professional, said agreement specifying that said recipient will not bring any frivolous professional liability claim against said professional.

18. The system of claim 14 further comprising means for advising others of issuance of said plan of insurance to said professional by said means for issuing.

19. The system of claim 18 wherein said means for advising sends, upon initiation of a professional liability claim against said professional, a communication to a proponent of said professional liability claim advising said proponent that said professional is covered by said plan of insurance.

20. The system of claim 18 further comprising:
means for maintaining a database of professionals covered under said plan of insurance; wherein:
said means for advising comprises means for linking said database to a publicly-accessible data communications interface for viewing by any member of the public, existence of said database being publicized.

21. The system of claim 20 wherein said linking means links said database to a public data network.

22. The system of claim 14 further comprising means for printing a certificate evidencing coverage for each professional accepted for coverage under said plan of insurance.

23. The system of claim 14 further comprising means for disbursing funds to pay costs of prosecuting said improper prosecution claim.

24. The system of claim 23 wherein said means for disbursing further disburses funds to pay costs of a disciplinary procedure against said expert witness before said professional society.

25. The system of claim 14 further comprising means for disbursing funds to pay costs of a disciplinary procedure against said expert witness before said professional society.

26. A system of deterring prosecution of frivolous professional liability claims against professionals by customers, said system comprising:
electronic digital computer means for processing an application from a professional for, and issuing to said professional, a plan of insurance to deter prosecution of frivolous professional liability claims against professionals by recipients of professional services by paying legal costs of prosecuting an improper prosecution claim against a proponent of a frivolous professional liability claim, said means for processing and issuing including:

means for accepting entry of application data, said application data including acceptance by said professional of a condition of coverage under said plan of insurance requiring said professional to obtain a written agreement from each new recipient of services from said professional, said agreement specifying that in connection with any claim by said recipient against said professional, said recipient will engage only an expert witness who belongs to a professional society having a code of conduct for expert testimony and having a disciplinary procedure for violations of said code of conduct, means for accepting entry of underwriting data, means for computing pricing for said plan of insurance based on said application data and said underwriting data, and means for issuing said plan of insurance based on said application data and said underwriting data.

27. A method of using an electronic digital computer system to deter prosecution of frivolous professional liability claims against professionals by recipients of professional services, said method comprising:

accepting entry into said computer system of application data from a professional for a plan of insurance to deter prosecution of frivolous professional liability claims against professionals by recipients of professional services by paying legal costs of prosecuting an improper prosecution claim against a proponent of a frivolous professional liability claim, said application data including acceptance by said professional of a condition of coverage under said plan of insurance requiring said professional to obtain a written agreement from each new recipient of services from said professional, said agreement specifying that in connection with any claim by said recipient against said professional, said recipient will engage only an expert witness who belongs to a professional society having a code of conduct for expert testimony and having a disciplinary procedure for violations of said code of conduct;

accepting entry of underwriting data into said computer system;

processing said application data and said underwriting data in said computer system, including computing pricing for said plan based on said application data and said underwriting data, and issuing said plan of insurance based on said application data and said underwriting data;

accepting entry into said computer system of a request, from a covered professional, for benefits under said plan of insurance, said request including a report of a professional liability claim, including data regarding said professional liability claim;

processing said request for benefits in said computer system to make an initial determination of whether said reported professional liability claim is frivolous; and upon an initial determination by said computer system that said reported professional liability claim is frivolous, authorizing disbursement of funds for said disciplinary procedure before said professional society.

28. The method of claim 27 further comprising advising others of said issuing.

29. The method of claim 28 wherein said advising comprises, upon initiation of a professional liability claim against said professional, sending a communication to a proponent of said professional liability claim advising said proponent that said professional is covered by said plan of insurance.

30. The method of claim 27 further comprising, for each professional accepted for coverage under said plan of insurance, printing a certificate evidencing said coverage.

31. The method of claim 27 further comprising disbursing funds to pay costs of said disciplinary procedure.

32. A system of deterring prosecution of frivolous professional liability claims against professionals by customers, said system comprising:

electronic digital computer means for processing an application from a professional for, and issuing to said professional, a plan of insurance to deter prosecution of frivolous professional liability claims against professionals by recipients of professional services by paying legal costs of prosecuting an improper prosecution claim against a proponent of a frivolous professional liability claim, said means for processing and issuing including:

means for accepting entry of application data, said application data including acceptance by said professional of a condition of coverage under said plan of insurance requiring said professional to obtain a written agreement from each new recipient of services from said professional, said agreement specifying that in connection with any claim by said recipient against said professional, said recipient will engage only an expert witness who belongs to a professional society having a code of conduct for expert testimony and having a disciplinary procedure for violations of said code of conduct, means for accepting entry of underwriting data, and means for computing pricing for said plan of insurance based on said application data and said underwriting data, and issuing said plan of insurance based on said application data and said underwriting data;

means for accepting a request, from a covered professional, for benefits under said plan of insurance, said request including a report of a professional liability claim, including data regarding said professional liability claim;

means for processing said request for benefits to make an initial determination of whether said reported professional liability claim is frivolous;

means for, upon an initial determination that said reported professional liability claim is frivolous, authorizing disbursement of funds for said disciplinary procedure before said professional society.

33. The system of claim 32 further comprising means for advising others of issuance of said plan of insurance to said professional by said means for computing and issuing.

34. The system of claim 33 wherein said means for advising sends, upon initiation of a professional liability claim against said professional, a communication to a proponent of said professional liability claim advising said proponent that said professional is covered by said plan of insurance.

35. The system of claim 32 further comprising means for printing a certificate evidencing coverage for each professional accepted for coverage under said plan of insurance.

36. The system of claim 32 further comprising means for disbursing funds to pay costs of said disciplinary procedure.

* * * * *